(12) United States Patent
Geiger et al.

(10) Patent No.: US 10,208,874 B2
(45) Date of Patent: Feb. 19, 2019

(54) RETAINING CLIP

(71) Applicant: HellermannTyton Corporation, Milwaukee, WI (US)

(72) Inventors: Gerard G. Geiger, Jackson, WI (US); Giovanni Lewinski, Milwaukee, WI (US)

(73) Assignee: HELLERMANNTYTON CORPORATION, Milwaukee, WI (US)

( * ) Notice: Subject to any disclaimer, the term of this patent is extended or adjusted under 35 U.S.C. 154(b) by 0 days.

(21) Appl. No.: 15/720,237

(22) Filed: Sep. 29, 2017

(65) Prior Publication Data

US 2018/0087692 A1 Mar. 29, 2018

Related U.S. Application Data

(60) Provisional application No. 62/401,496, filed on Sep. 29, 2016.

(51) Int. Cl.
| | |
|---|---|
| *H01R 4/64* | (2006.01) |
| *F16L 3/04* | (2006.01) |
| *F16L 3/123* | (2006.01) |
| *F16L 3/13* | (2006.01) |
| *F16L 3/237* | (2006.01) |
| *F16L 3/24* | (2006.01) |

(Continued)

(52) U.S. Cl.
CPC ............... *F16L 3/04* (2013.01); *F16L 3/1233* (2013.01); *F16L 3/13* (2013.01); *F16L 3/237* (2013.01); *F16L 3/24* (2013.01); *F24S 80/00* (2018.05); *H02G 3/30* (2013.01); *H02S 40/00* (2013.01); *F16B 2/245* (2013.01); *F16B 5/0685* (2013.01); *F16B 5/121* (2013.01); *H01R 4/64* (2013.01)

(58) Field of Classification Search
CPC ................ F16L 35/121; H05K 3/3405; H05K 2201/10386
See application file for complete search history.

(56) References Cited

U.S. PATENT DOCUMENTS

| | | | |
|---|---|---|---|
| 3,122,604 A * | 2/1964 | Cook ................... | H01R 4/4809 174/51 |
| 3,790,916 A * | 2/1974 | Keitel .................. | H05K 3/3405 439/435 |

(Continued)

FOREIGN PATENT DOCUMENTS

CN 201723842 U 1/2011

*Primary Examiner* — Briggitte R Hammond
(74) *Attorney, Agent, or Firm* — Robert J. Myers

(57) ABSTRACT

A retaining clip configured to secure an elongate member to a generally planar panel is described herein. The retaining clip includes a first side wall, a second side wall opposite the first side wall, and an end wall interconnecting the side walls. The side walls define a gap configured to receive the panel. The retaining clip includes further includes a resilient first cantilevered prong projecting into the gap from the first side wall and a resilient second cantilevered prong projecting from into the first gap from the second side wall. Free ends of the first and second prongs are characterized as having a pair of pointed barbs on distal edges of the first and second prongs. The pointed barbs are configured to increase a removal force required to remove the panel from the first gap. A method of forming such a retaining clip is also described.

9 Claims, 12 Drawing Sheets

(51) Int. Cl.
*H02G 3/30* (2006.01)
*H02S 40/00* (2014.01)
*F24S 80/00* (2018.01)
*F16B 5/06* (2006.01)
*F16B 5/12* (2006.01)
*F16B 2/24* (2006.01)

(56) References Cited

U.S. PATENT DOCUMENTS

| | | | | |
|---|---|---|---|---|
| 4,993,959 | A * | 2/1991 | Randolph | H01R 4/64 439/855 |
| 5,364,287 | A * | 11/1994 | Weber | H01R 13/6395 439/358 |
| 5,451,167 | A * | 9/1995 | Zielinski | H01R 4/245 439/435 |
| 6,106,310 | A * | 8/2000 | Davis | H01R 4/26 439/92 |
| 6,428,349 | B1 * | 8/2002 | Dickson | H01C 1/01 439/507 |
| 6,634,891 | B1 * | 10/2003 | Cheng | H05K 13/0486 29/741 |
| 7,686,625 | B1 * | 3/2010 | Dyer | H01R 4/64 439/857 |
| 8,382,513 | B2 * | 2/2013 | Kobayashi | F24J 2/5207 439/507 |
| 2003/0233738 | A1 | 12/2003 | Osterland et al. | |
| 2008/0254688 | A1 * | 10/2008 | Bogursky | H01R 13/113 439/858 |
| 2013/0255123 | A1 | 10/2013 | Boyer | |

* cited by examiner

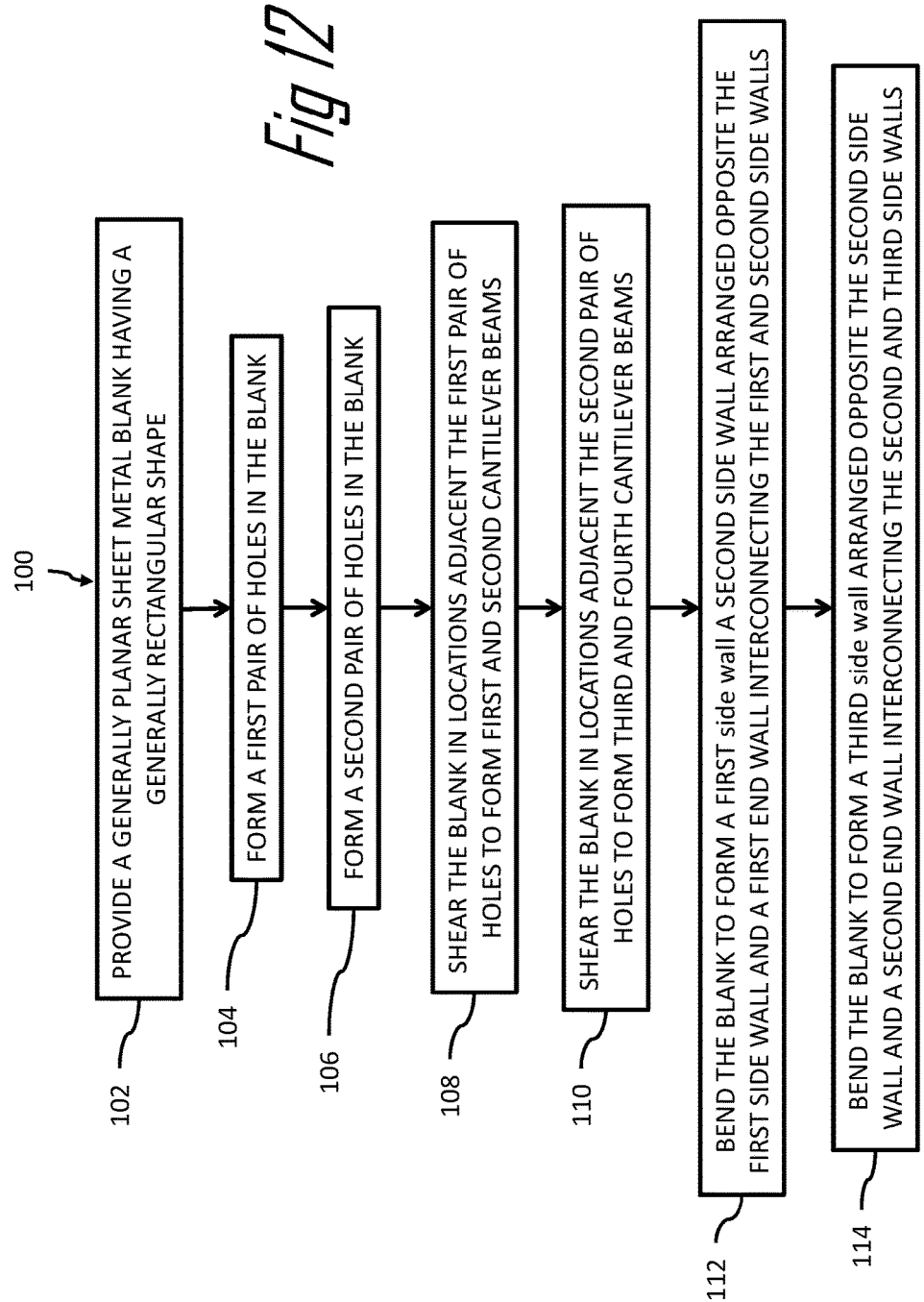

RETAINING CLIP

CROSS-REFERENCE TO RELATED APPLICATION

This application claims the benefit under 35 USC § 119(e) of U.S. Provisional Patent Application No. 62/401,496 filed on Sep. 29, 2016, the entire disclosure of which is hereby incorporated by reference.

TECHNICAL FIELD OF THE INVENTION

The invention generally relates to a retaining clip, and more particularly relates to a retaining clip particularly suited for retaining electrical wiring in a solar panel assembly.

BRIEF SUMMARY OF THE INVENTION

According to an embodiment of the invention, a retaining clip configured to secure an elongate member to a generally planar panel is provided. The retaining clip includes a first side wall, a second side wall arranged opposite the first side wall, and a first end wall interconnecting the first and second side walls. The first and second side walls define a first gap therebetween that is configured to receive the panel though a first opening opposite the first end wall. The retaining clip includes further includes a resilient first cantilevered prong projecting into the first gap from the first side wall and a resilient second cantilevered prong projecting from into the first gap from the second side wall. Free ends of the first and second cantilevered prongs are characterized as having a first pair of pointed barbs on distal edges of the first and second cantilevered prongs. The first pair of pointed barbs are configured to increase a removal force required to remove the panel from the first gap.

The free ends of the first and second cantilevered prongs may form a concave arcuate shape between the first pair of pointed barbs. The first and second cantilevered prongs may form arcuate shapes relative to the first and second side walls respectively. Alternatively, the first and second cantilevered prongs may project angularly from the first and second side walls respectively.

The retaining clip may also include a resilient third cantilevered prong adjacent the first cantilevered prong and projecting into the first gap from the first side wall and a resilient fourth cantilevered prong adjacent the second cantilevered prong and projecting from into the first gap from the second side wall. The free ends of the third and fourth cantilevered prongs are characterized as having a second pair of pointed barbs on the distal edges of the third and fourth cantilevered prongs. The third and fourth prongs may form arcuate shapes relative to the first and second side walls respectively.

A removal force required to remove the panel from the first gap may be at least two times greater than an installation force required to insert the panel within the first gap.

The distal edges of the retaining clip may be rounded to minimize chafing of the elongate member.

The distal edges of the each of the first, second, third, and fourth prongs may define an angle of about 15 degrees relative to each other.

The retaining clip may additionally include a third side wall arranged opposite the second side wall and a second end wall interconnecting the second and third side walls. The second and third side walls define a second gap therebetween that is configured to receive the elongate member though a second opening opposite the second end wall.

According to another embodiment of the invention, a method of forming a retaining clip is provided. The method includes the steps of providing a generally planar sheet metal blank having a generally rectangular shape, forming a first pair of round holes in the blank, and shearing the blank in locations adjacent the first pair of round holes to form resilient first and second cantilevered prongs projecting from the blank. Free ends of the first and second cantilevered prong are characterized as having a first pair of pointed barbs on distal edges of the first and second cantilevered prongs and form a concave arcuate shape between the first pair of pointed barbs. The method further includes the step of bending the blank to form a first side wall a second side wall arranged opposite the first side wall and a first end wall interconnecting the first and second side walls such that the first and second side walls define a first gap therebetween, the first cantilevered prong projects from the first side wall into the first gap, and the second cantilevered prong projects from the second side wall into the first gap.

The method may also include the steps of forming a second pair of round holes in the blank and shearing the blank in locations adjacent the second pair of round holes to form resilient third and fourth cantilevered prongs projecting from the blank, wherein the free ends of the third and fourth cantilevered prongs are characterized as having a second pair of pointed barbs on the distal edges of the third and fourth cantilevered prongs and form a concave arcuate shape between the second pair of pointed barbs.

The method may additionally include the step of bending the blank to form a third side wall arranged opposite the second side wall and a second end wall interconnecting the second and third side walls, wherein the second and third side walls define a second gap therebetween.

Further features and advantages of the invention will appear more clearly on a reading of the following detailed description of the preferred embodiment of the invention, which is given by way of non-limiting example only and with reference to the accompanying drawings.

BRIEF DESCRIPTION OF THE SEVERAL VIEWS OF THE DRAWING

The present invention will now be described, by way of example with reference to the accompanying drawings, in which:

FIG. 12 is a flow chart of a method of forming a retaining claim in accordance with a third embodiment.

DETAILED DESCRIPTION OF THE INVENTION

A retaining clip is described herein. This clip is particularly suited for securing electrical wires within solar panel assemblies although it is also suited for retaining other elongate members, e.g. fluid or pneumatic tubing, to other generally planar panels of other types of assemblies. The retaining clip is designed so that the force required to remove the clip from the panel is greater that the force required to secure the retaining clip to the panel.

Figure 1:
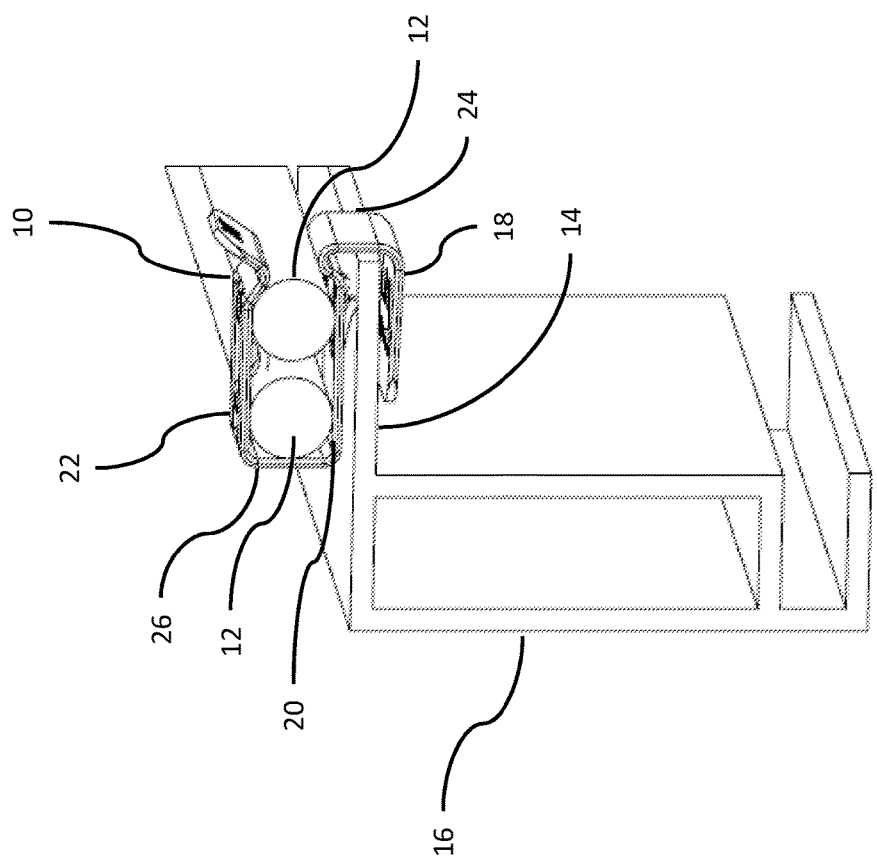
FIG. 1 is a perspective view of a retaining clip securing an elongate element to a panel in accordance with a first embodiment.
Figure 2:
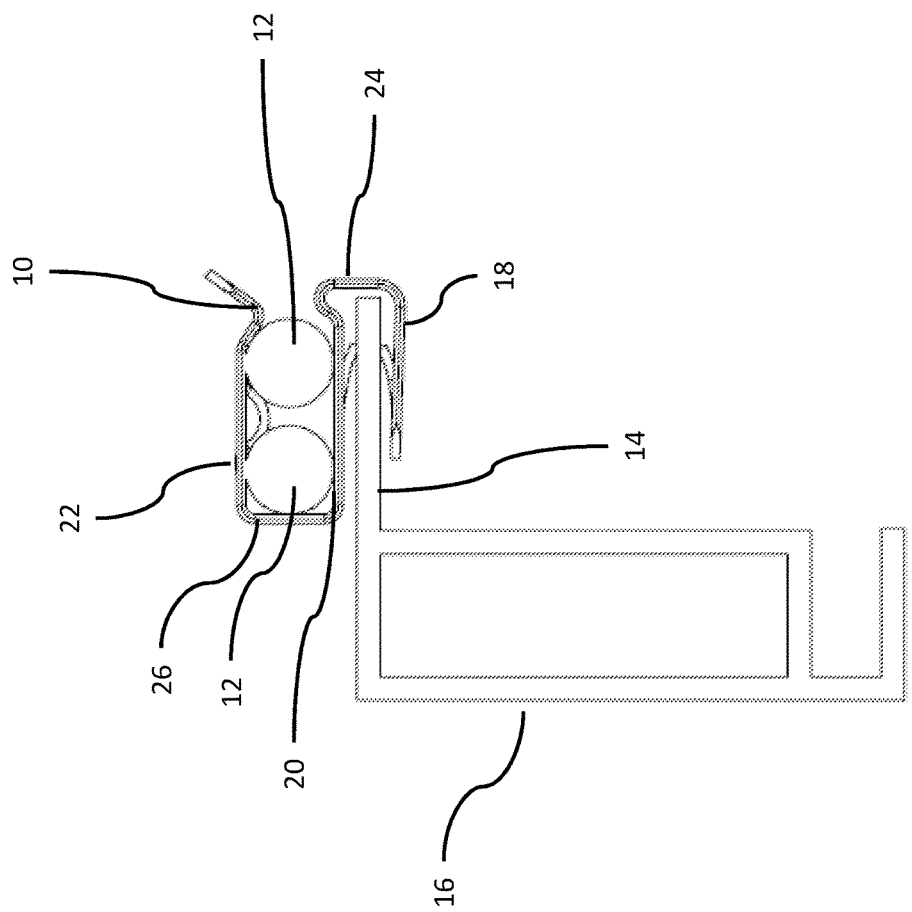
FIG. 2 is a side view of the retaining clip of FIG. 1 securing an elongate element to a panel in accordance with the first embodiment.
Figure 3:
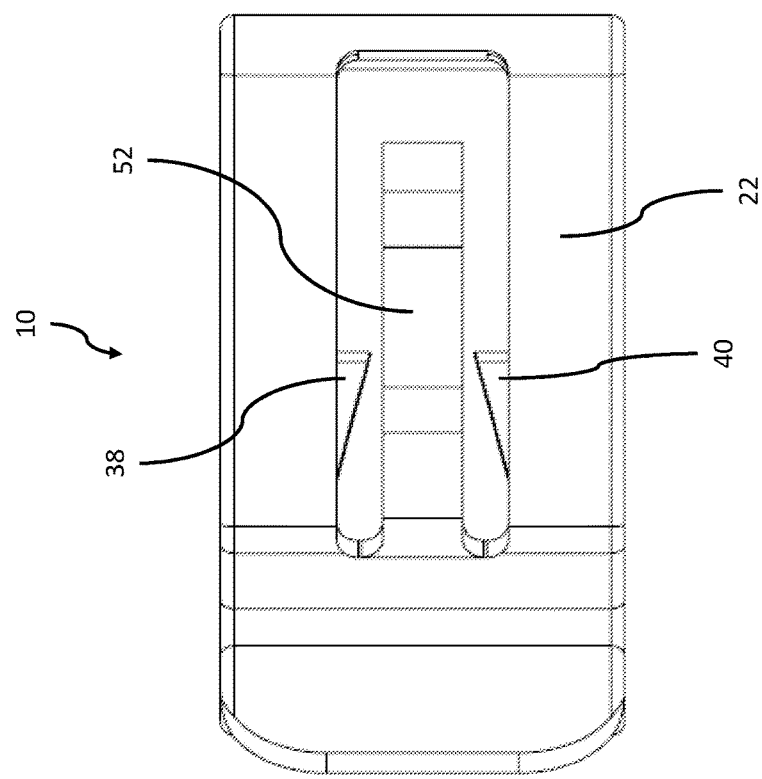
FIG. 3 is a top view of the retaining clip of FIG. 1 in accordance with the first embodiment.
Figure 4:
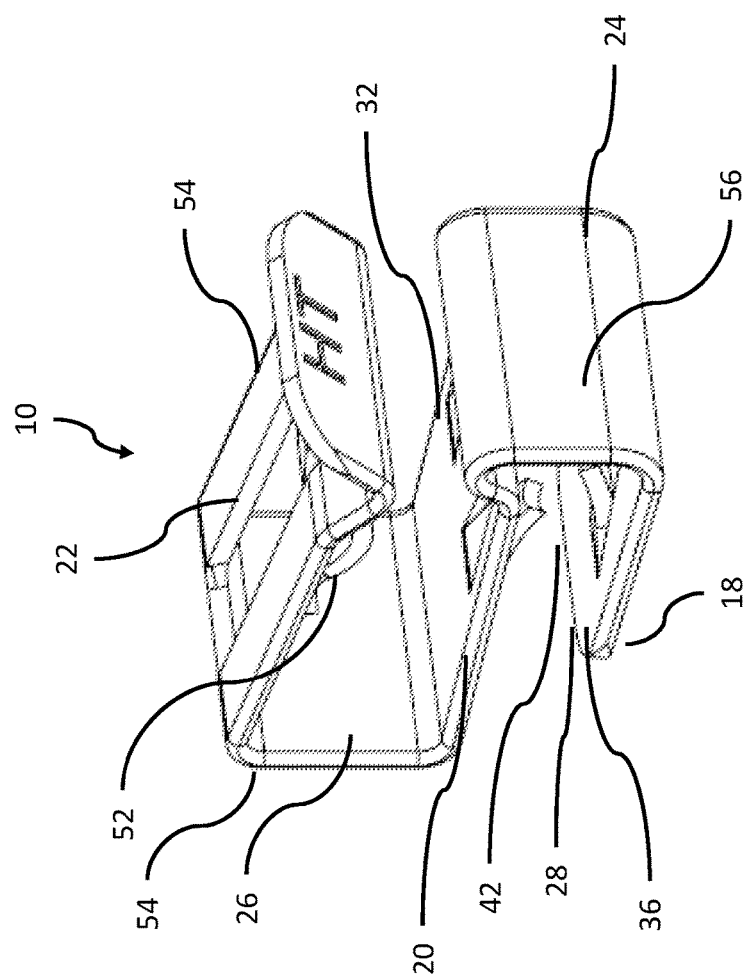
FIG. 4 is a perspective end view of the retaining clip of FIG. 1 in accordance with the first embodiment.
Figure 5:
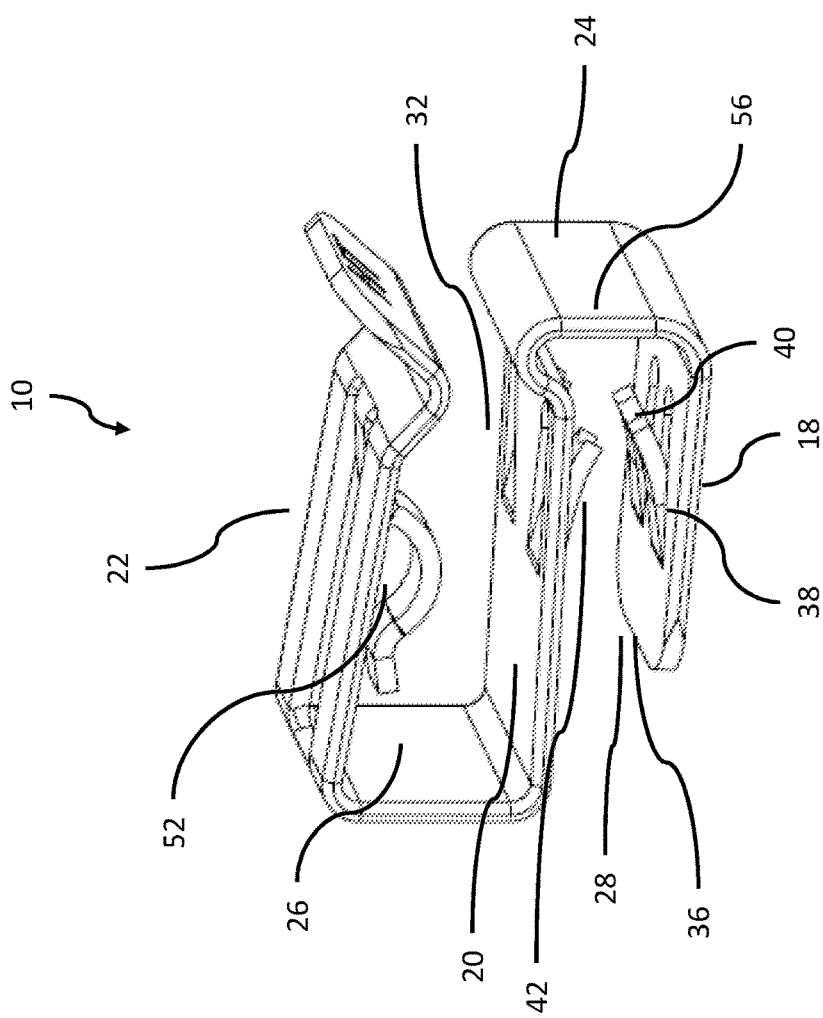
FIG. 5 is a perspective side view of the retaining clip of FIG. 1 in accordance with the first embodiment.
Figure 6:
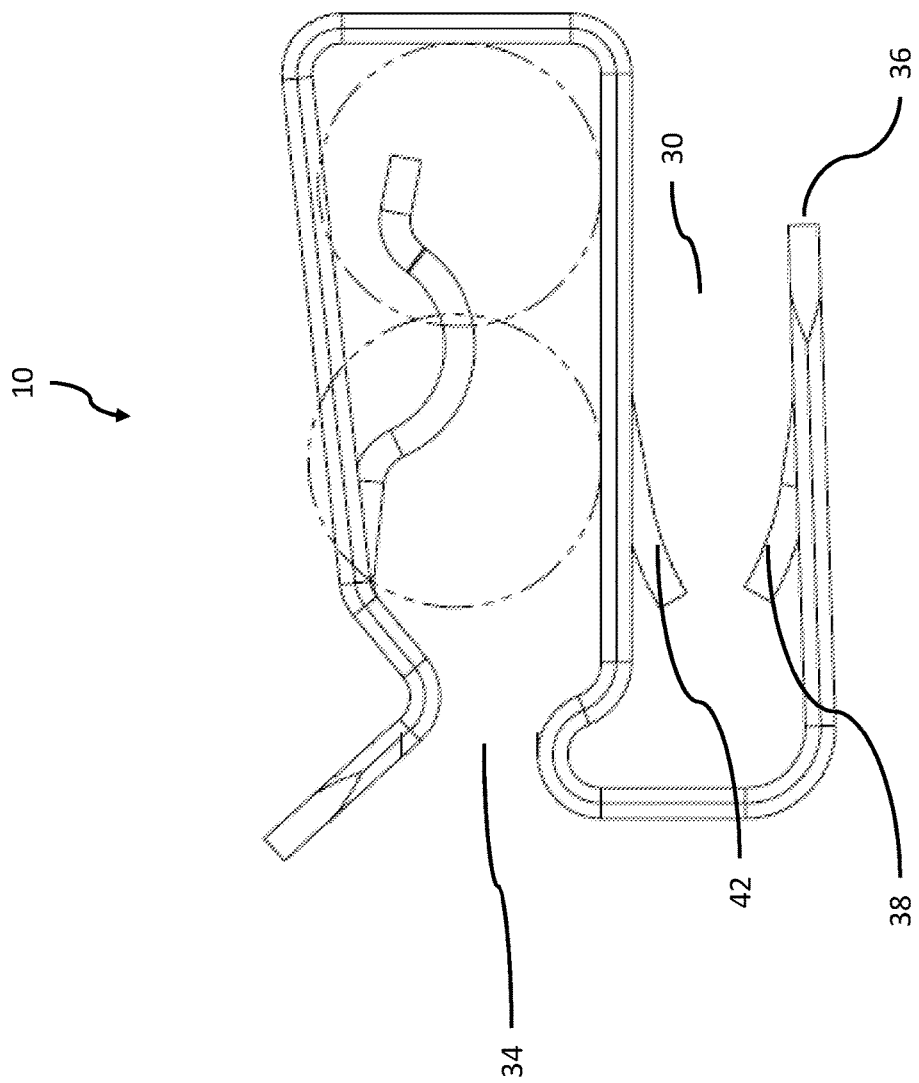
FIG. 6 is a side view of the retaining clip of FIG. 1 in accordance with the first embodiment.

FIGS. 1 and 2 show a non-limiting example of a retaining clip 10 that is configured to secure a pair of electrical wires 12 to a generally planar section 14 of a solar panel assembly 16. As can be seen in the figures, the retaining clip 10 has a squared S shape with three mutually opposed horizontal walls 18, 20, 22 and two opposed end walls 24, 26. The clip 10 is configured so that the panel 14 is received between the first and second side walls 18, 20 and the wires are received between the second and third side walls 20, 22. The first and second end walls are joined by the first end wall 24 and the second and third side walls 20, 22 are joined by the second end wall 26. The first and second side walls 18, 20 define a first gap 28 between them into which the panel 14 is received though a first opening 30 located opposite the first end wall 24. The second and third side walls 20, 22 define a second gap 32 between them into which the wires are received though a second opening 34 located opposite the second end wall 26. A free end 36 of the first side wall 18 is angled toward the second side wall 20 so that the clip 10 will exert a spring force on the panel 14 in order to retain them within the clip 10. The clip 10 may be formed of a spring steel, such as 304¾ hard stainless steel.

Figure 7:
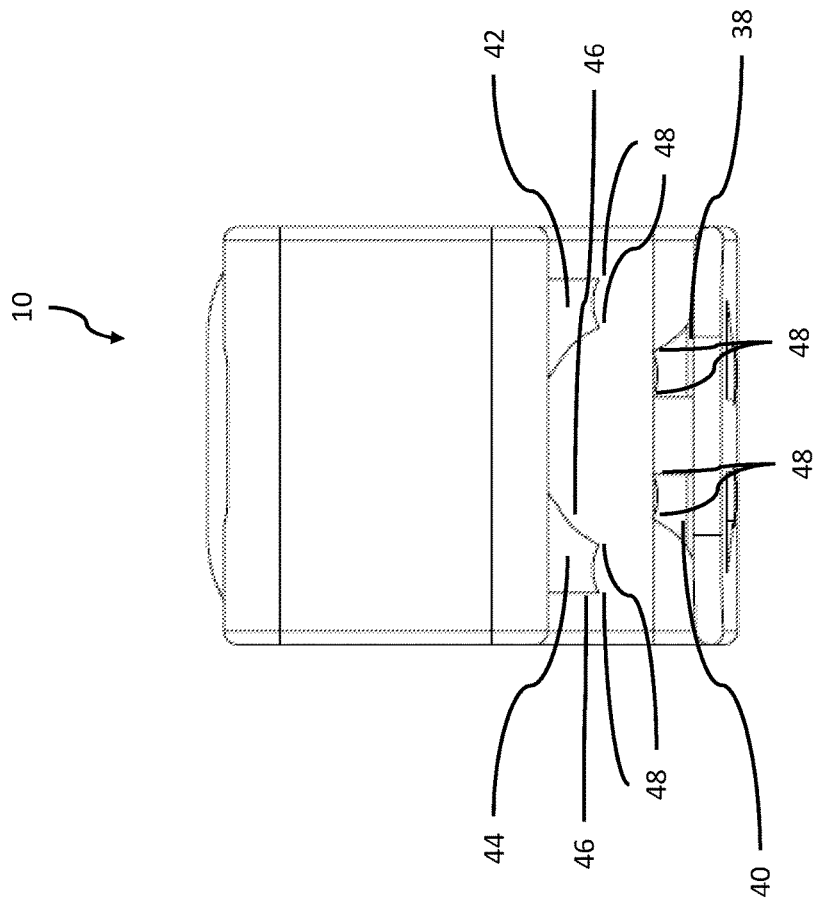
FIG. 7 is an end view of the retaining clip of FIG. 1 in accordance with the first embodiment.
Figure 8:
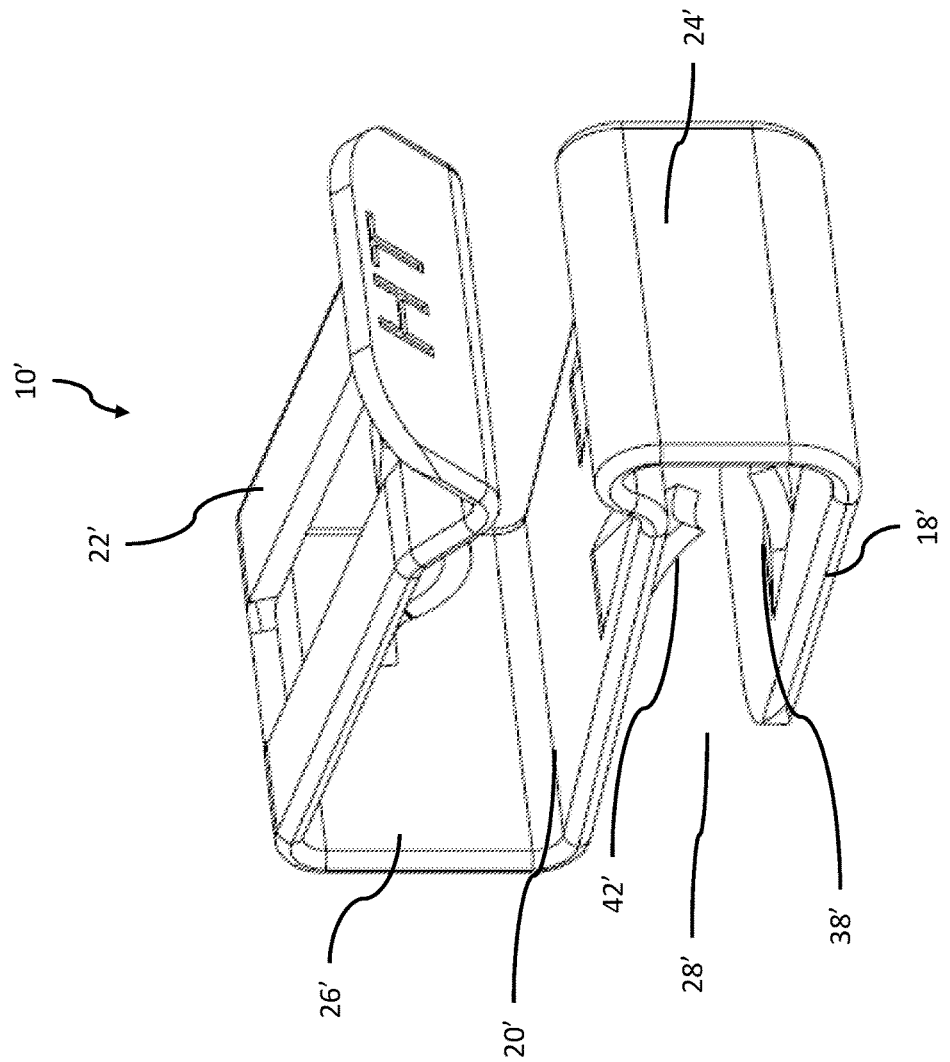
FIG. 8 is a perspective end view of a retaining clip in accordance with a second embodiment.
Figure 9:
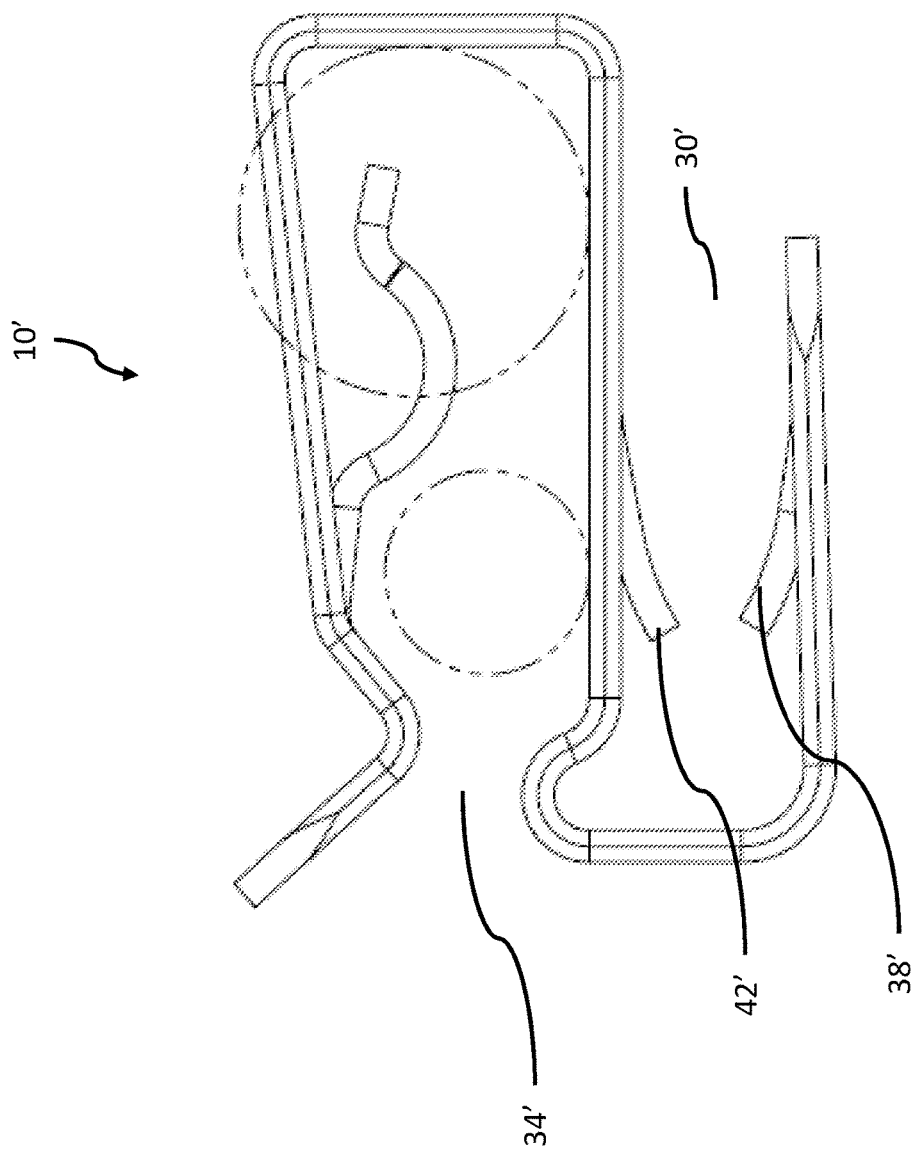
FIG. 9 is a side view of the retaining clip of FIG. 8 in accordance with the second embodiment.
Figure 10:
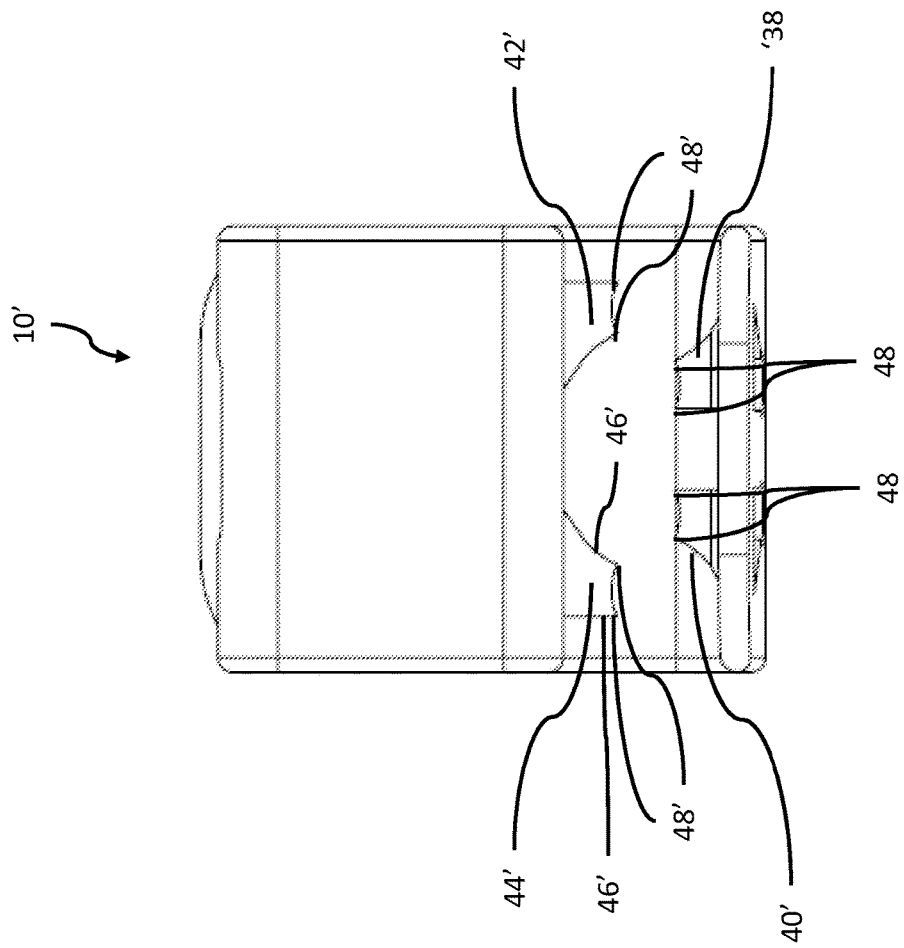
FIG. 10 is an end view of the retaining clip of FIG. 8 in accordance with the second embodiment.

As shown in FIGS. 3-10, the retaining clip 10 includes a first pair of resilient cantilevered prongs 38, 40 projecting from the first side wall 18 into the first gap 28 between the first and second side walls 18, 20 and a second pair of resilient cantilevered prongs 42, 44 projecting into the first gap 28 from the second side wall 20. The free ends of these cantilevered prongs 38, 40, 42, 44 are located opposite the first opening 30. Each of the free ends has a pair of pointed barbs 48 on the distal edges 46 of the prongs 38, 40, 42, 44. As the panel 14 is inserted into the first gap 28, the panel 14 will contact the prongs 38, 40, 42, 44 and cause the first pair of barbed prongs 38, 40 to flex toward the first side wall 18 while the second pair of barbed prongs 40 flex toward the second side wall 20. These pointed barbs 48 are configured so they "bite" into the panel 14 as the clip 10 is removed from the panel 14 causing the first pair of barbed prongs 38, 40 to flex toward the second side wall 20 and the second pair of barbed prongs 40 to flex toward the first side wall 18 thereby increasing the force required to remove the retaining clip 10 from the panel 14 so that it is greater than the force required to install the clip 10 on the panel 14. As best shown in FIGS. 7 and 10, the free ends of the barbed prongs 38, 40, 42, 44 form a concave arcuate shape between the pairs of pointed barbs 48.

In a first embodiment of the retaining clip 10 shown in FIGS. 3-7, the barbed prongs 38, 40, 42, 44 are angled inwardly from the first and second side walls 18, 20 at an angle of about 16 degrees and are substantially straight from the fixed end to the free end of the barbed prongs 38, 40, 42, 44.

In a second embodiment of the retaining clip 10' shown in FIGS. 8-10, the barbed prongs 38', 40', 42', 44' are curved away from the first and second side walls 18', 20' forming an arcuate shape from the fixed end to the free end 36'.

The inventors have observed that the force required to remove the retaining clip 10 from the panel 14 (120.3 newtons) is more than twice the force required to install the clip 10 on the panel 14 (52.3 newtons) on a panel 14 formed of anodized 6061 aluminum having a thickness of 1.6 mm when the clip 10 is formed from 304¾ hard stainless steel. Testing of the 304¾ hard stainless steel clip 10' with a thinner panel (1.5 mm) of anodized 6061 aluminum found that the force required to remove the retaining clip 10 from the panel 14 was 100.0 newtons and the force required to install the clip 10 on the panel 14 was 38.3 newtons. Similar results were observed for non-anodized aluminum plates.

The wires are separated and retained within the second gap 32 by a leaf spring 52 which projects into the second gap 32 from the third side wall. The leaf spring 52 is configured to adjust to various diameter wires and to minimize migration of the wires within the second gap 32.

The distal edges 54 of the retaining clip 10 are rounded to minimize chafing of wire insulation by the retaining clip 10.

The first end wall 24 forms a push pad 56 that may be used by an operator to push the retaining clip 10 onto the panel 14, e.g. using a finger or a tool.

While the illustrated embodiments include a pair of barbed prongs projecting from the first and second side walls on both sides the first gap, other embodiments of the invention may be envisioned having a single barbed prong projecting from the first and/or second side wall. Still other alternative embodiments may be environed having more than two barbed prongs projecting from the first and/or second side walls.

Figure 11:
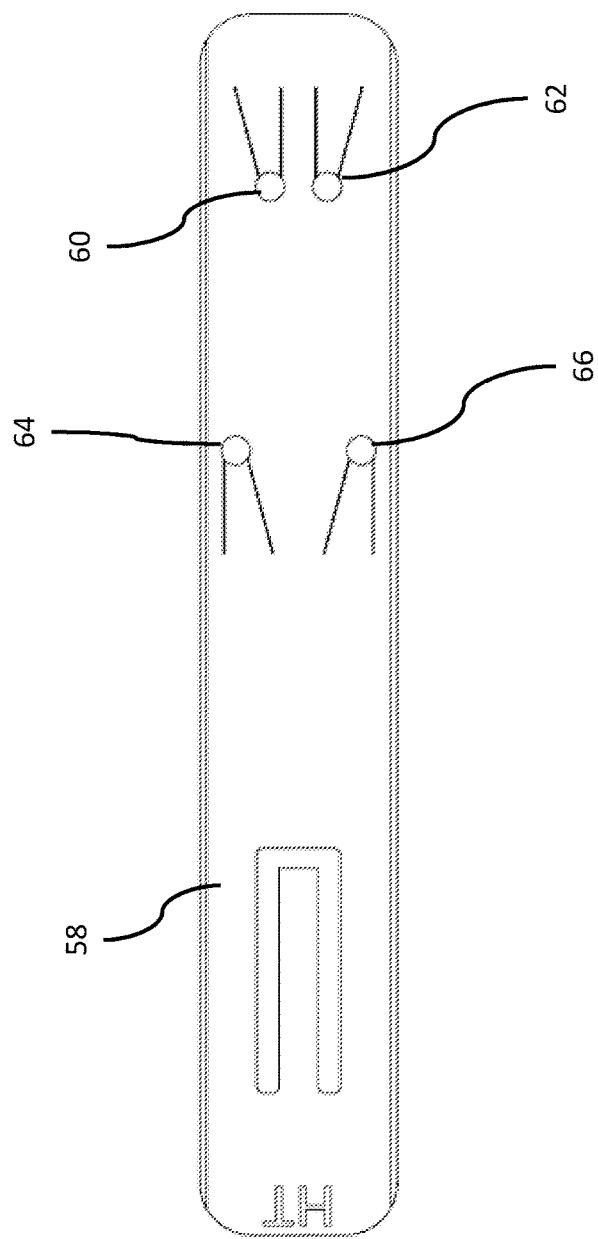
FIG. 11 is top view of the retaining clip of FIG. 1 or FIG. 8 prior to a bending process in accordance with the first or second embodiment.

A non-limiting example of a method 100 of forming a retaining clip, such as the retaining clip described above, is presented in FIG. 12. The steps of this method 100 are described below:

STEP 102, PROVIDE A GENERALLY PLANAR SHEET METAL BLANK HAVING A GENERALLY RECTANGULAR SHAPE, includes providing a generally planar sheet metal blank 58 having a generally rectangular shape as shown in FIG. 11;

STEP 104, FORM A FIRST PAIR OF HOLES IN THE BLANK, includes forming a first pair of round holes 60, 62 in the blank 58 as shown in FIG. 11, preferably using a punch process to provide a sharp edge on the holes 60, 62;

STEP 106, FORM A SECOND PAIR OF HOLES IN THE BLANK, includes forming a second pair of round holes 64, 66 in the blank 58 as shown in FIG. 11. preferably using a punch process to provide a sharp edge on the holes 64, 66;

STEP 108, SHEAR THE BLANK IN LOCATIONS ADJACENT THE FIRST PAIR OF HOLES TO FORM FIRST AND SECOND CANTILEVERED PRONGS, includes shearing the blank 58 in locations adjacent the first pair of holes 60. 62 using a triangular shaped punch having a minimum angle of about 15 degrees and bending the sheared portions out of alignment with the blank 58 to form resilient first and second cantilevered prongs 38, 42 projecting from the blank 58 as shown in FIGS. 4-10. The free ends of the first and second cantilevered prongs 38, 42 are characterized as having a pair of pointed barbs 48 on the distal edges 46 of the first and second cantilevered prongs 38, 40 and form a concave arcuate shape between the pairs of pointed barbs 48;

STEP 110, SHEAR THE BLANK IN LOCATIONS ADJACENT THE SECOND PAIR OF HOLES TO FORM THIRD AND FOURTH CANTELIVERED PRONGS, includes shearing the blank 58 in locations adjacent the second pair of holes 64, 66 using a triangular shaped punch having a minimum angle of about 15 degrees and bending the sheared portions out of alignment with the blank 58 to form resilient third and fourth cantilevered prongs 40, 44 projecting from the blank 58 as shown in FIGS. 4-10. The free ends of the third and fourth cantilevered prongs 40, 44 are characterized as having a pair of pointed barbs 48 on the distal edges 46 of the third and fourth cantilevered prongs 40, 44 and form a concave arcuate shape between the pairs of pointed barbs 48. Stamping tool maintenance is minimal and is easily replaced with standard round and triangular shaped punches;

STEP 112, BEND THE BLANK TO FORM A FIRST SIDE WALL A SECOND SIDE WALL ARRANGED OPPOSITE THE FIRST SIDE WALL AND A FIRST END WALL INTERCONNECTING THE FIRST AND SECOND SIDE WALLS, includes bending the blank 58 to form a first side wall 18 a second side wall 20 arranged opposite the first side wall 18 and a first end wall 24 interconnecting the first and second side walls 18, 20 such that the first and second side walls define a first gap 28 therebetween such that the first cantilevered prong projects from the first side wall 18 into the first gap 28 and the second cantilevered prong projects from the second side wall 20 into the first gap 28 as shown in FIGS. 4-10; and STEP 114, BEND THE BLANK TO FORM A THIRD SIDE WALL ARRANGED OPPOSITE THE SECOND SIDE WALL AND A SECOND END WALL INTERCONNECTING THE SECOND AND THIRD SIDE WALLS, includes bending the blank 58 to form a third side wall arranged opposite the second side wall 20 and a second end wall 26 interconnecting the second and third side walls 20, 22 such that the second and third side walls 20, 22 define a second gap 32 therebetween as shown in FIGS. 4-10.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

In the following claims, the terms "including" and "in which" are used as the plain-English equivalents of the respective terms "comprising" and "wherein." Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items. Additionally, directional terms such as upper, lower, etc. do not denote any particular orientation, but rather the terms upper, lower, etc. are used to distinguish one element from another and locational establish a relationship between the various elements.

Further, the limitations of the following claims are not written in means-plus-function format and are not intended to be interpreted based on 35 USC § 112(f), unless and until such claim limitations expressly use the phrase "means for" followed by a statement of function void of further structure.

We claim:

1. A retaining clip configured to secure an elongate member to a generally planar panel, said retaining clip comprising:
    a first side wall;
    a second side wall arranged opposite the first side wall;
    a first end wall interconnecting the first and second side walls, wherein the first and second side walls define a first gap therebetween that is configured to receive the panel though a first opening opposite the first end wall;
    a resilient first cantilevered prong projecting into the first gap from the first side wall; and
    a resilient second cantilevered prong projecting into the first gap from the second side wall, wherein free ends of the first and second cantilevered prongs define a sharp pointed barb on each distal edge of the first and second cantilevered prongs, wherein the free ends of the first and second cantilevered prongs form a concave arcuate shape having a constant radius between the pointed barbs, and wherein the pointed barbs are configured to increase a removal force required to remove the panel from the first gap.

2. The retaining clip in accordance with claim 1, wherein the first and second cantilevered prongs form arcuate shapes relative to the first and second side walls respectively.

3. The retaining clip in accordance with claim 1, wherein the first and second cantilevered prongs project angularly from the first and second side walls respectively.

4. The retaining clip in accordance with claim 1, wherein the retaining clip further comprises:
    a resilient third cantilevered prong adjacent the first cantilevered prong and projecting into the first gap from the first side wall; and
    a resilient fourth cantilevered prong adjacent the second cantilevered prong and projecting from into the first gap from the second side wall, wherein free ends of the third and fourth cantilevered prongs define a sharp pointed barb on each distal edge of the third and fourth cantilevered prongs, wherein the free ends of the third and fourth cantilevered prongs form a concave arcuate shape having a constant radius between the pointed barbs, and wherein the pointed barbs are configured to increase a removal force required to remove the panel from the first gap.

5. The retaining clip in accordance with claim 4, wherein the third and fourth prongs form arcuate shapes relative to the first and second side walls respectively.

6. The retaining clip in accordance with claim 1, wherein the removal force required to remove the panel from the first gap is at least two times greater than an installation force required to insert the panel within the first gap.

7. The retaining clip in accordance with claim 1, wherein distal edges of the retaining clip are rounded to minimize chafing of the elongate member.

8. The retaining clip in accordance with claim 1, wherein distal edges of the each of the first, second, third, and fourth prongs define an angle of about 15 degrees relative to each other.

9. The retaining clip in accordance with claim 1, wherein the retaining clip further comprises:
- a third side wall arranged opposite the second side wall; and
- a second end wall interconnecting the second and third side walls, wherein the second and third side walls define a second gap therebetween that is configured to receive the elongate member though a second opening opposite the second end wall.

* * * * *